United States Patent
Ohr et al.

(10) Patent No.: US 10,578,173 B2
(45) Date of Patent: Mar. 3, 2020

(54) SWITCHABLE CYLINDRICAL WEDGE CLUTCH

(71) Applicant: SCHAEFFLER TECHNOLOGIES AG & CO. KG, Herzogenaurach (DE)

(72) Inventors: Carsten Ohr, Charlotte, NC (US); Ryan Carlino, Charlotte, NC (US); Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 130 days.

(21) Appl. No.: 15/916,781

(22) Filed: Mar. 9, 2018

(65) Prior Publication Data

US 2019/0277350 A1  Sep. 12, 2019

(51) Int. Cl.
| | |
|---|---|
| F16D 41/06 | (2006.01) |
| F16D 13/16 | (2006.01) |
| F16D 13/71 | (2006.01) |
| F16D 13/56 | (2006.01) |
| F16D 13/26 | (2006.01) |

(52) U.S. Cl.
CPC ............ F16D 41/06 (2013.01); F16D 13/16 (2013.01); F16D 13/26 (2013.01); F16D 13/56 (2013.01); F16D 13/71 (2013.01)

(58) Field of Classification Search
CPC .......... F16D 13/16; F16D 13/26; F16D 13/56; F16D 13/71; F16D 41/06
See application file for complete search history.

(56) References Cited

U.S. PATENT DOCUMENTS

| | | | |
|---|---|---|---|
| 9,533,703 B2 * | 1/2017 | Shimizu ................ | B62D 5/001 |
| 2013/0327609 A1 | 12/2013 | Kawai et al. | |
| 2014/0332335 A1 | 11/2014 | Strong | |
| 2015/0152922 A1 | 6/2015 | Lee et al. | |
| 2015/0204394 A1 * | 7/2015 | Luo ........................ | F16D 41/06 |
| | | | 192/45.1 |
| 2017/0227065 A1 * | 8/2017 | Ince ........................ | F16D 13/06 |

FOREIGN PATENT DOCUMENTS

| | | | | |
|---|---|---|---|---|
| DE | 102016222450 A1 * | 5/2018 | ............. | F16D 11/06 |
| JP | 2005042898 A | 2/2005 | | |
| JP | 2017137937 A | 8/2017 | | |

OTHER PUBLICATIONS

International Search Report and Written Opinion for International Application No. PCT/US2019/017847 dated Jun. 4, 2019.

* cited by examiner

*Primary Examiner* — Stacey A Fluhart

(74) *Attorney, Agent, or Firm* — Brooks Kushman P.C.

(57) ABSTRACT

A switchable wedge clutch includes an inner race, and an outer race that has an inner surface defining a plurality of tapered regions. A plurality of wedge plate are disposed between the inner and outer races, and are moveable circumferentially about the inner race. Each wedge plate segment has a tapered outer surface configured to engage and slide relative to the tapered regions of the outer race. An actuating ring has a plurality of axially-extending tapered fingers configured to fit between two of the wedge plate segments. The wedge plate segments are wedged between the tapered regions and the inner race to lock the inner and outer race together. Axial movement of the actuating ring forces the wedge plate segments circumferentially against biasing forces of springs to unwedge the wedge plate segments from between the outer race and the inner race and unlock the wedge clutch.

16 Claims, 7 Drawing Sheets

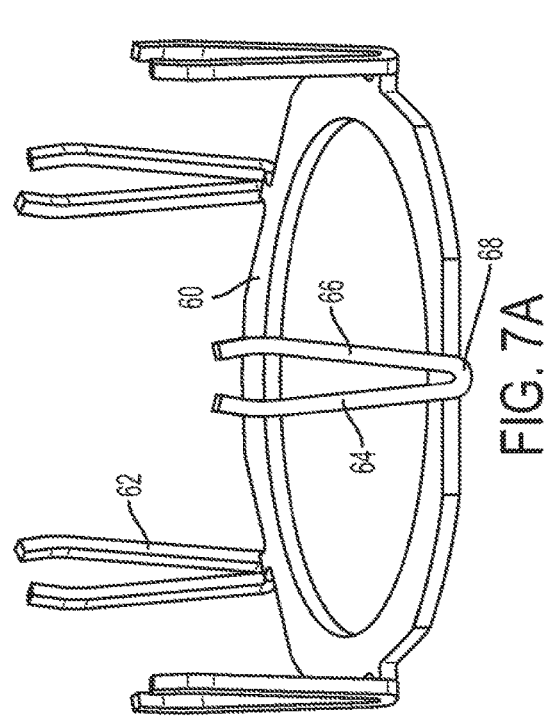
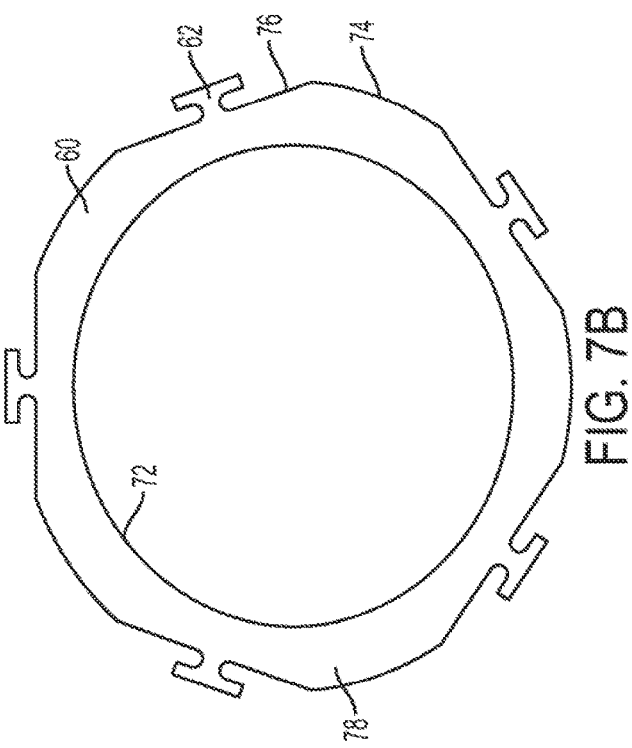
FIG. 7A
FIG. 7B

SWITCHABLE CYLINDRICAL WEDGE CLUTCH

TECHNICAL FIELD

The present disclosure relates to a switchable wedge clutch for selectively transferring torque from one rotating shaft to another shaft.

BACKGROUND

Various clutches are known in the art for transferring torque or rotational energy from one shaft to another. A dog clutch is one known example. Wedge clutches are being developed as an alternative structure for coupling an input shaft to an output shaft. A wedge clutch may include an inner race extending from or connected to one of the shafts, and an outer race extending from or connected to the other of the shafts. A wedge plate is radially disposed between the inner and outer races and is configured to radially engage the inner and outer races when the clutch is locked to transmit power from the input shaft to the output shaft.

SUMMARY

According to one embodiment, a switchable wedge clutch includes an inner race extending about an axis and having an outer surface defining a plurality of grooves. The switchable wedge clutch includes an outer race having an inner surface defining a plurality of tapered regions. The switchable wedge clutch includes a plurality of wedge plate segments, each wedge plate segment having an inner surface moveable within the grooves and circumferentially about the inner race, and each wedge plate segment having a tapered outer surface configured to engage and slide relative to the tapered regions of the inner surface of the outer race. The switchable wedge clutch also includes a plurality of springs arranged about the axis, each spring coupled to a respective pair of the wedge plate segments and providing a biasing force to bias the pair of wedge plate segments away from each other. The switchable wedge clutch includes an actuating ring having a plurality of axially-extending tapered fingers configured to fit between two of the wedge plate segments, wherein axial movement of the actuating ring forces the wedge plate segments circumferentially against the biasing force of the springs.

According to another embodiment, a switchable wedge clutch includes an inner race, an outer race, a plurality of wedge plate segments, and an actuating ring. The inner race and the outer race are both rotatable about an axis, and one of the inner and outer races has first tapered surfaces. The wedge plate segments are arranged circumferentially about the axis, with each wedge plate segment having a second tapered surface contacting the first tapered surface. The actuating ring extends about the axis and has a plurality of fingers extending axially between the inner and outer races. Axial movement of the actuating ring moves the wedge plate segments circumferentially along the first tapered surfaces to lock or unlock the switchable wedge clutch.

In another embodiment, a system for selectively transferring torque between shafts is provided. A hub is connected about an input shaft. The hub has an outer surface with a plurality of tapered regions. A plurality of wedge plate segments include a first wedge plate segment, a second wedge plate segment, and a third wedge plate segment, with each wedge plate segment having a tapered inner surface contacting one of the tapered regions, and each wedge plate segment having an outer surface. An outer race has an inner surface engaging the outer surfaces of the wedge plate segments, wherein the plurality of wedge plate segments are circumferentially slideable relative to the outer race. A plurality of springs are arranged about the hub and include a first spring between the first and second wedge plate segments and configured to provide a biasing force to bias the first and second wedge plate segments away from each other. An actuating ring has a plurality of fingers about the outer surface of the hub. The plurality of fingers include a first finger extending axially between the second and third wedge plate segments. Axial movement of the actuating ring forces the second wedge plate segment toward the first wedge plate segment.

BRIEF DESCRIPTION OF THE DRAWINGS

FIG. 7A is a perspective view of the spring plate of FIG. 6, and FIG. 7B is a bottom view of the spring plate, according to one embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below.

Terms such as "outer" and "inner" are relative to the central axis. For example, an "outer" surface means that the surfaces face away from the central axis, or is outboard of another "inner" surface. Terms such as "radial," "diameter," "circumference," etc. also are relative to the central axis. The term "axial" can mean extending along the center axis, or extending in a direction parallel to the center axis.

Figure 1:
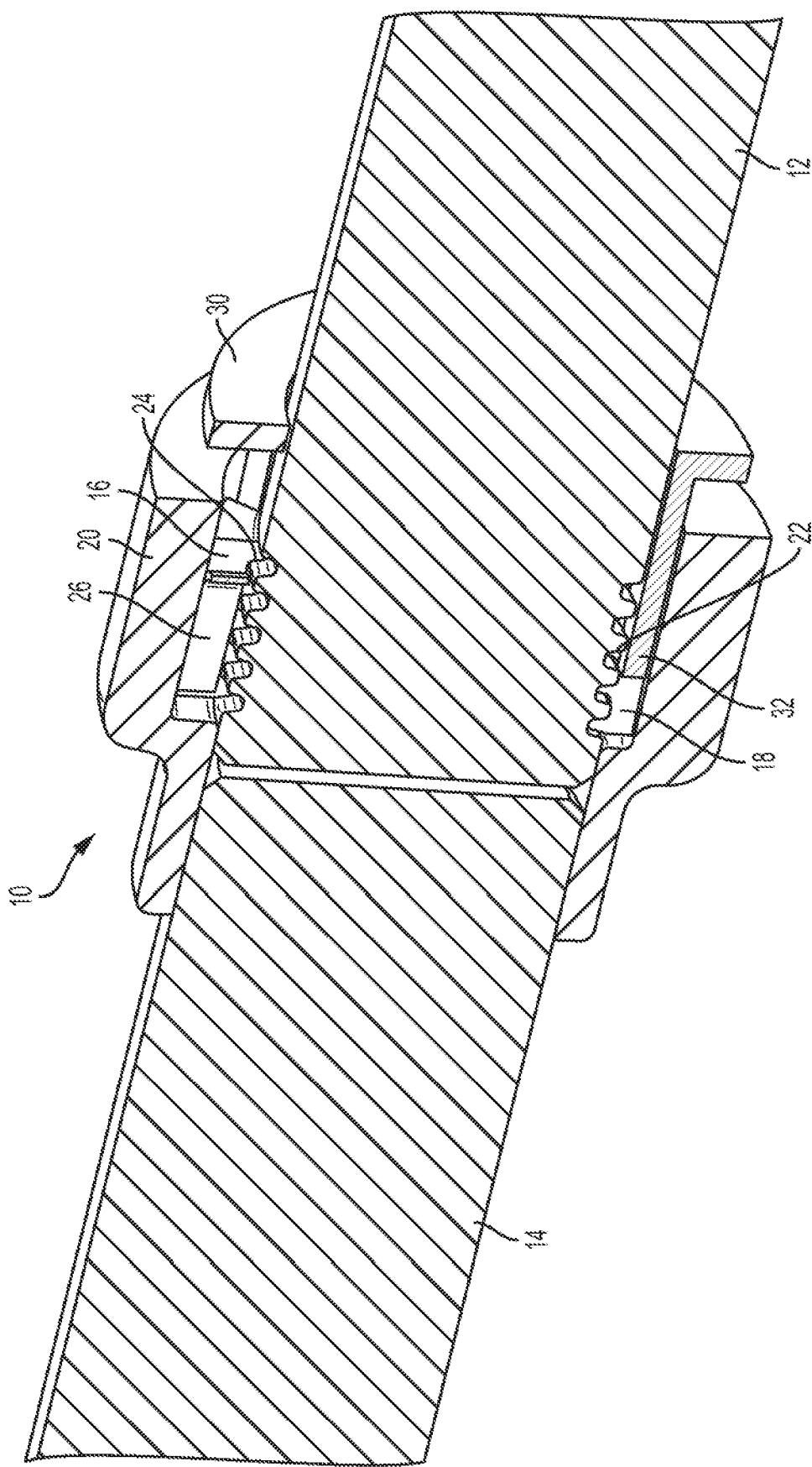
FIG. 1 is a cross-sectional perspective view of a switchable cylindrical wedge clutch for selectively transferring torque from a first shaft to a second shaft, according to one embodiment.

FIG. 1 is a cross-sectional perspective view of a switchable cylindrical wedge clutch 10. The switchable cylindrical wedge clutch 10 is configured to couple an input shaft (or first shaft) 12 to an output shaft (or second shaft) 14. The shafts 12, 14 can rotate together along a common axis when the switchable cylindrical wedge clutch 10 is locked, and the first shaft 12 can rotate without rotating the second shaft 14 when the switchable cylindrical wedge clutch 10 is unlocked. Various components of the switchable cylindrical wedge clutch 10 are also arranged circumferentially about the axis, including the wedge plate segments, the springs, and the actuating ring, which will be described below.

As will be further described below with reference to other Figures, the switchable cylindrical wedge clutch 10 includes a plurality of wedge plate segments, or plate segments 16. Two of such plate segments are shown in FIG. 1, namely a first plate segment 16 and a second plate segment 18. More plate segments may be present, as will be described. The plate segments are located radially between the first shaft 12 and a carrier 20, which may be connected to or an integral part of the second shaft 14. The first shaft 12 may be provided with a series of circumferential grooves 22. The inner surfaces of the plate segments may have corresponding grooves 24 so that the plate segments can mesh with the first shaft 12 and move circumferentially relative to the first shaft 12 along the grooves 22. As will also be described below, the outer surfaces of the plate segments can be tapered in the circumferential direction, and engage with corresponding tapered surfaces in the interior of the carrier. A plurality of springs 26 bias the plate segments in a circumferential direction such that the plate segments are sufficiently wedged between the first shaft 12 and the carrier 20. This transfers torque from the input shaft 12, to the carrier 20 and to the second shaft 14.

As will also be further described below, an actuating ring 30 is provided for unlocking the switchable cylindrical wedge clutch 10. In particular, the actuating ring 30 can be driven (via a power mechanism, not shown) axially relative to the first shaft 12. The actuating ring 30 has one or more tapered fingers 32 that fit between two circumferentially-adjacent plate segments. As the actuating ring 30 is driven axially, the tapered finger 32 separate two adjacent plate segments against the biasing force of the spring 26, forcing the plate segments to rotate circumferentially relative to the first shaft 12 to an unlocked position such that the tapered outer surfaces of the plate segments are no longer forced into wedged contact with the tapered inner surface of the carrier 20. This unlocks the switchable cylindrical wedge clutch 10, allowing the first shaft 12 to rotate without transferring torque to the second shaft 14.

Figure 2:
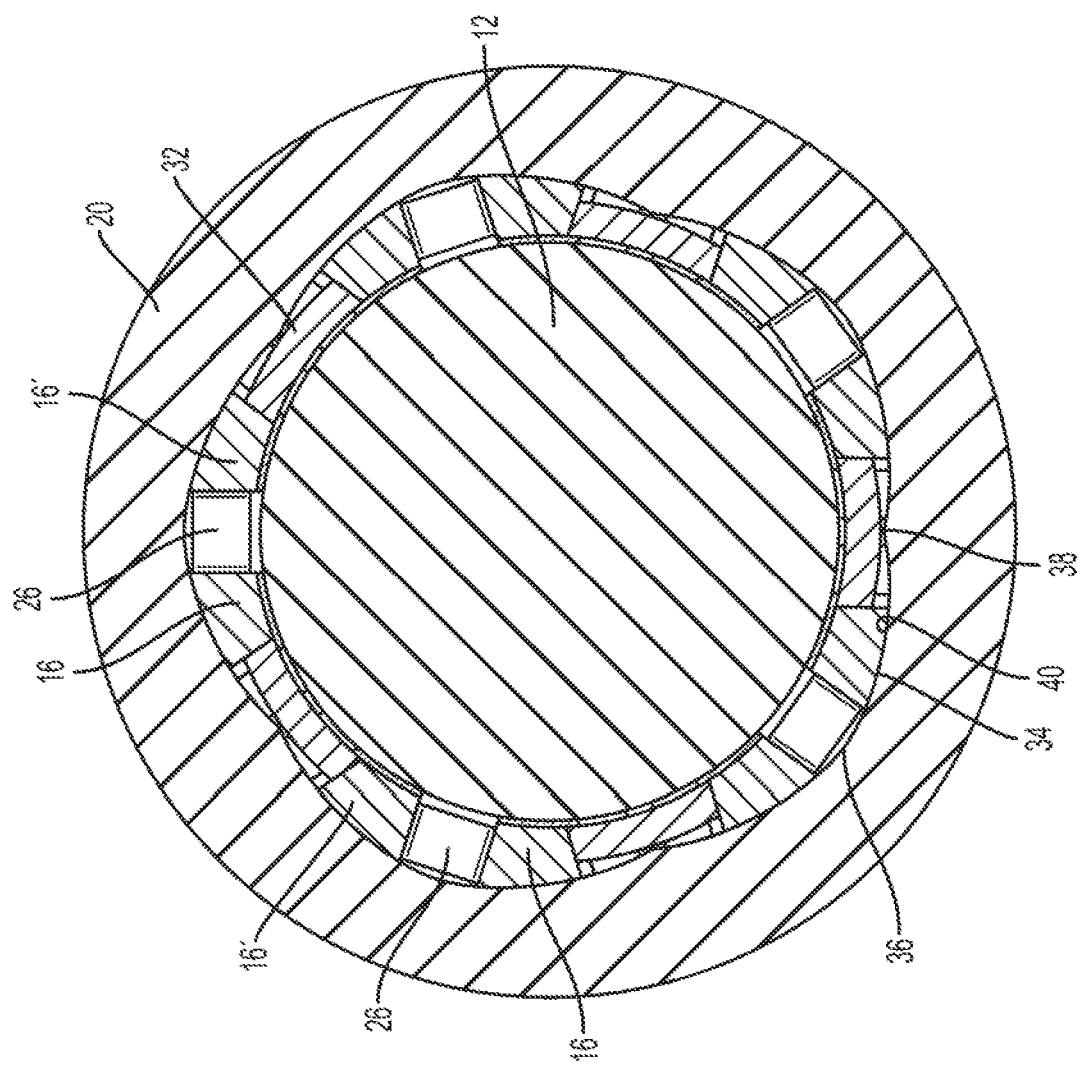
FIG. 2 is a cross-sectional view of a switchable cylindrical wedge clutch according to an embodiment.

FIG. 2 illustrates a cross-sectional view of the switchable cylindrical wedge clutch 10. The first shaft 12 rotates within the carrier 20 and can lock with the carrier 20 to transfer torque to the second shaft (not shown). As shown, the switchable cylindrical wedge clutch 10 includes five separate pairs of plate segments 16, each pair separated by and connected via a spring 26. The springs 26 bias each plate segment of the pair of plate segments away from one another. For example, each spring 26 biases one of the plate segments 16 away from another plate segment 16' in the circumferential direction. In the illustrated embodiment, five pairs of plate segments are provided, each pair separated by a spring, thus requiring five springs. However, more or less than five pairs of plate segments and five springs may be provided, depending on design requirements.

The inner surface 34 of the carrier 20 has tapered region. In particular, the inner surface 34 may have a plurality of valleys 36 and a plurality of peaks or apexes 38 radially inward from the valleys 36. The outer surface 40 of the plate segments are also tapered such that the outer surface 40 slopes relative to the central axis of the switchable cylindrical wedge clutch 10. In other words, the outer surface 40 of the plate segments is tapered opposite the taper of the inner surface 34 of the carrier 20. When a pair of plate segments 16, 16' are biased away from one another, they are wedged radially between the carrier and the first shaft 12 to lock rotation therebetween. As will be described below, the fingers 32 of the actuating ring 30 can be forced axially to press the pair of plate segments 16, 16' together and remove the wedging lock between the first shaft 12 and the carrier 20.

Figure 3:
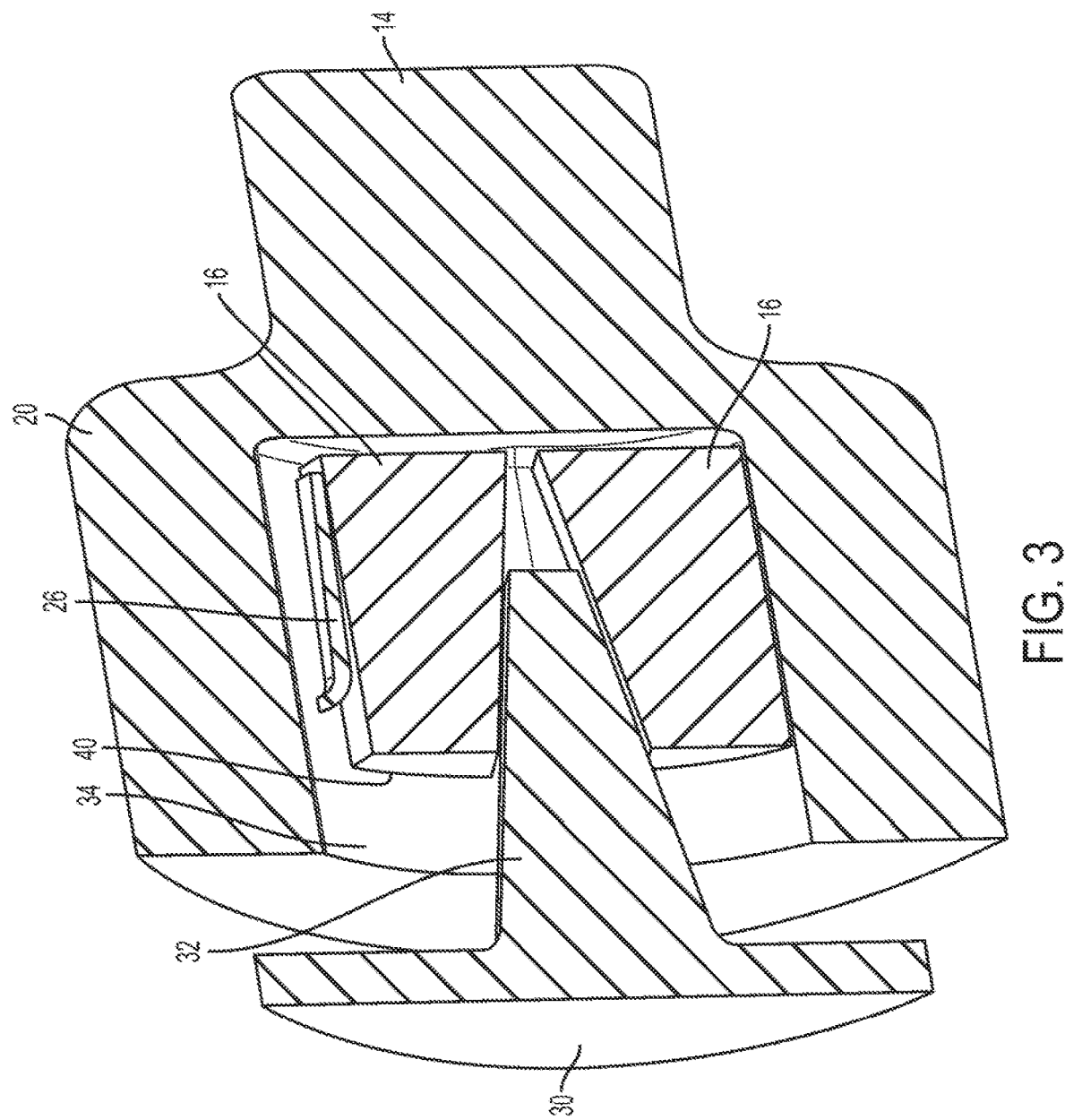
FIG. 3 is a partial cross-sectional perspective view of a portion of the switchable cylindrical wedge clutch, particularly in a region in which a actuating ring engages wedge plate segments, according to an embodiment.

FIG. 3 illustrates a cross-sectional view of a portion of the actuating ring 30 and one of its fingers 32 for locking and unlocking the switchable cylindrical wedge clutch 10, according to one embodiment. The finger 32 fits between two of the plate segments. Axial movement of the actuating ring 30 toward the plate segments 16 causes the plate segments 16 that contact that finger 32 to separate circumferentially via the grooves 22 in the first shaft 12. Doing so separates the outer surface 40 of the plate segments from the inner surface 34 of the carrier 20, unwedging the plate segments 16 from between the first shaft 12 and the carrier 20, and allowing the switchable cylindrical wedge clutch 10 to be in the unlocked state. Retraction of the actuating ring 30 allows the springs 26 to push the plate segments in the opposite circumferential direction, wedging the plate segments 16 again between the first shaft 12 and the carrier 20 and allowing the switchable cylindrical wedge clutch 10 to be in the locked state.

Figure 4A:
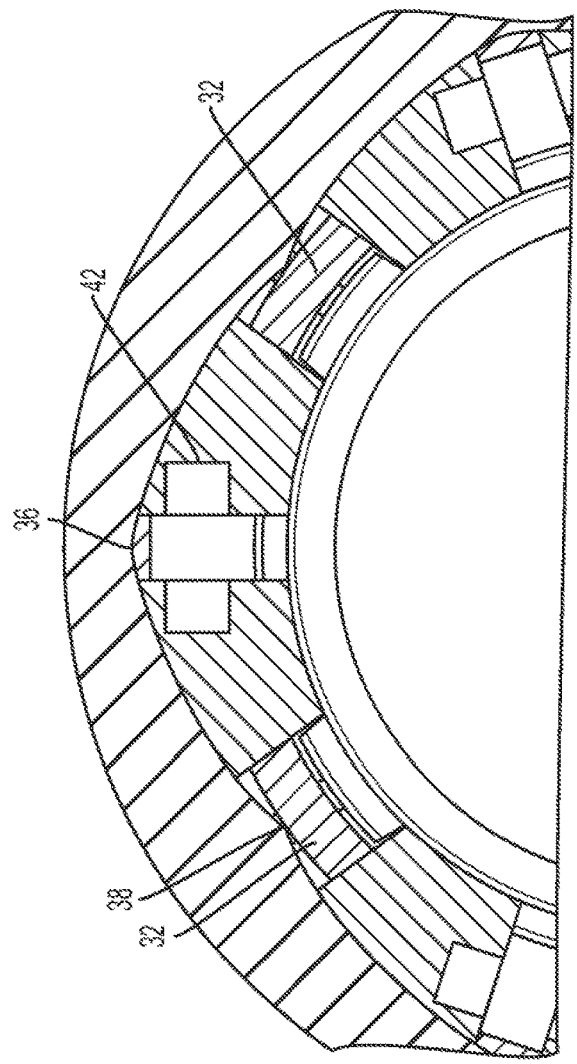
FIG. 4A is a cross-sectional view of a portion of the switchable cylindrical wedge clutch in a locked mode.
Figure 4B:
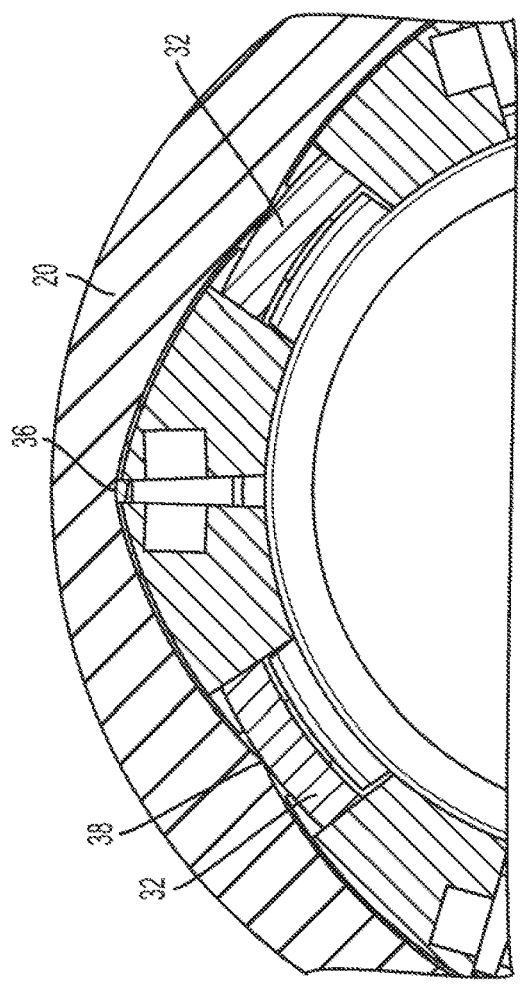
FIG. 4B shows the switchable cylindrical wedge clutch in an unlocked mode, according to one embodiment.

FIG. 4A illustrates a partial cross-sectional view of the switchable cylindrical wedge clutch 10 in the locked state, and FIG. 4B shows the switchable cylindrical wedge clutch 10 in the unlocked state. In the locked state, the actuating ring 30 is retracted from the plate segments 16. This allows the springs (not shown, but can be within pockets 42 formed in the plate segments 16) to press the plate segments 16 into their wedged position, with the outer surface 40 of the plate segments contacting the inner surface 34 of the carrier 20. The springs force the plate segments 16 toward the adjacent apex 38 to create the wedge between the first shaft 12, the plate segments 16, and the carrier 20.

In the unlocked state shown in FIG. 4B, the actuating ring 30 and its fingers 32 have traveled axially further into the switchable cylindrical wedge clutch 10. This causes the plate segments 16 to press against the springs and move circumferentially relative to the carrier. In other words, the plate segments 16 are forced to move away from the apex 38 and more toward the adjacent valley 36. The tapered nature of the outer surface 40 and the inner surface 34 thus allows the plate segments 16 to unwedge from between the first shaft 12 and the carrier 20. A gap can exist radially between the plate segments 16 and the shaft 12 in this unlocked state.

Multiple sets of wedge plate segments 16 may be provided about the axis, stacked axially along the first shaft 12. This increases the frictional engagement between the first shaft 12 and the carrier 20.

The embodiments shown in FIGS. 1-4B illustrate a certain configuration in which the axial movement of the actuating ring 30 toward the plates 16 unlocks the switchable cylindrical wedge clutch 10. However, it should be understood that this configuration can be reversed in other embodiments. For example, the springs can pull the plates together rather than pushing them apart. Axial translation of the actuating ring can push adjacent plate segments together, forcing them to wedge between the first shaft and the carrier and locking the switchable cylindrical wedge clutch. This can be done by a substitution of the biasing direction of the spring and a relocation of the fingers of the actuating ring.

Figure 5:
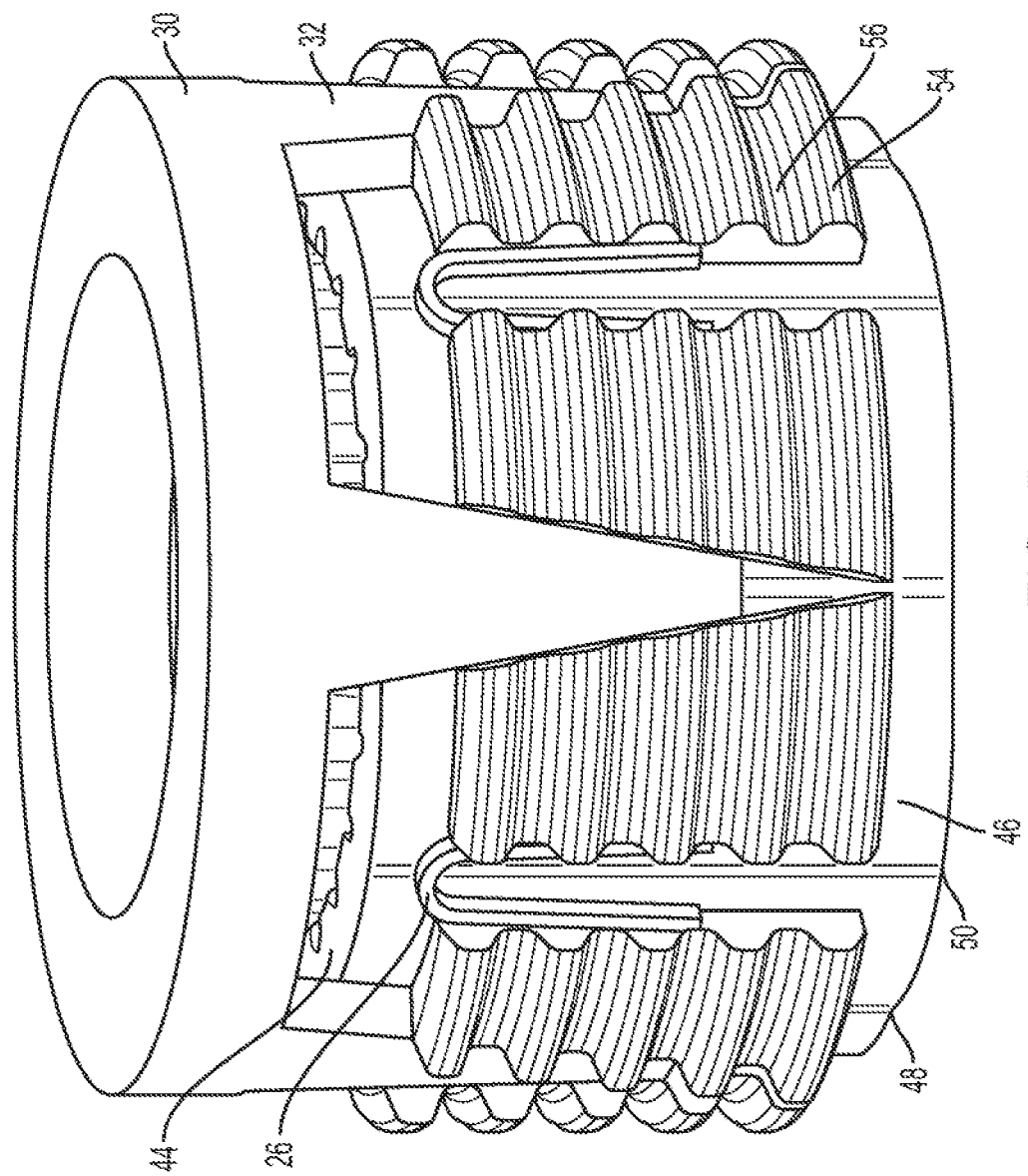
FIG. 5 is a perspective view of another embodiment of a switchable cylindrical wedge clutch in which springs are separately connected between pairs of wedge plate segments.

FIG. 5 illustrates another embodiment of the switchable cylindrical wedge clutch in which the plate segments have their grooves on the outer surface thereof to engage with the inner surface of the carrier. In this embodiment, a hub 44 is provided which is connected to the first shaft via a spline connection, for example. The hub 44 has a tapered outer surface 46 that has alternating valleys 48 and apexes 50, similar to that of the carrier 20 in the previous embodiments. The wedge plate segments 54 each have an inner surface that is tapered corresponding to the outer surface of the hub 44. The plate segments 54 have a series of grooves 56 formed thereon to engage with corresponding grooves of the carrier or second shaft (not shown). To unlock the switchable cylindrical wedge clutch, the actuating ring 30 is pressed axially so that the fingers 32 separate adjacent plate segments 54 against the biasing force of the springs 26. This forces the plate segments 54 in a direction toward the apexes 50, unwedging the plate segments 54 from between the outer surface 46 of the hub 44 and the inner surface of the carrier (not shown). To return the switchable cylindrical wedge clutch to the locked position, the actuating ring 30 is retracted, allowing the springs 26 to force the plate segments 54 back toward the valleys 48 of the hub 44 in a wedging engagement.

Figure 6:
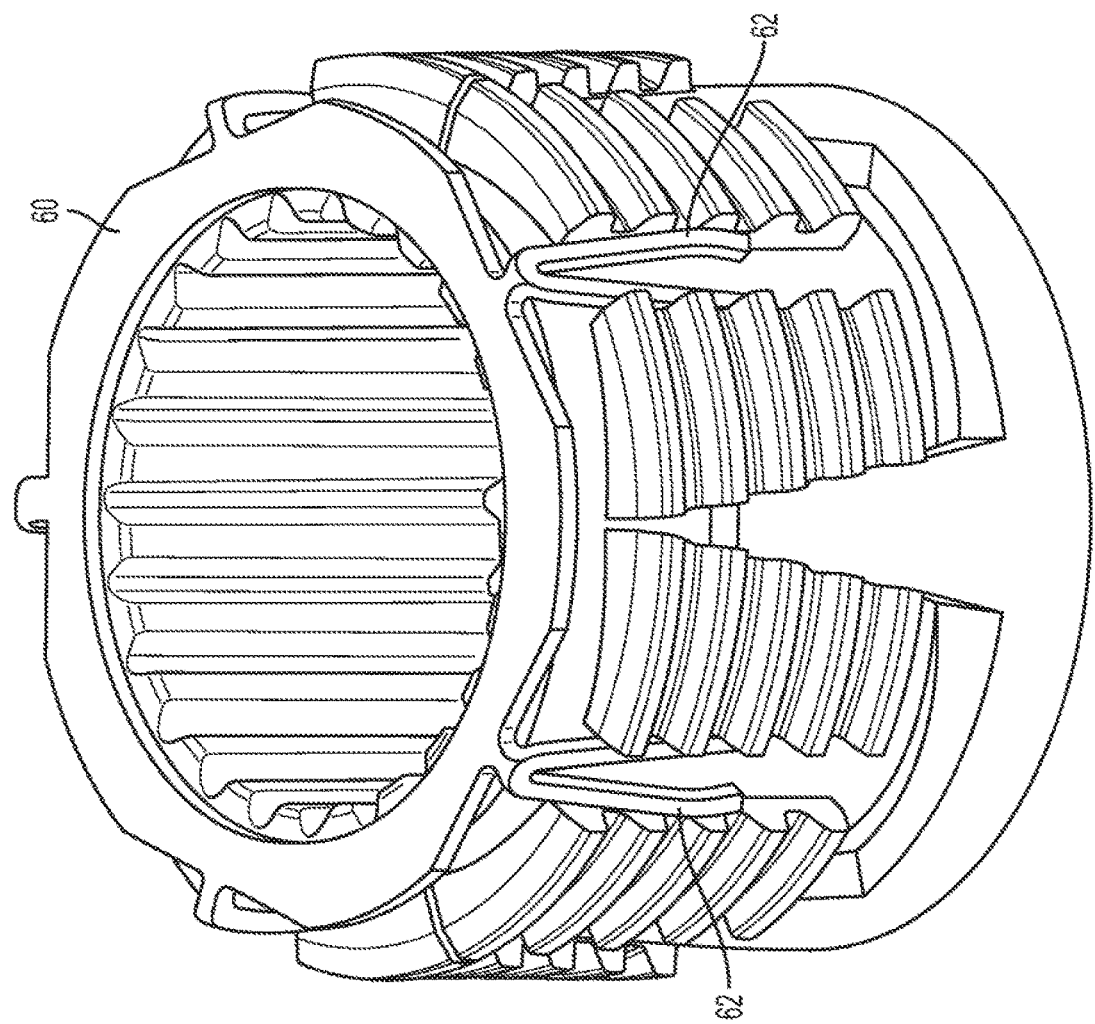
FIG. 6 is a perspective view of yet another embodiment of the switchable cylindrical wedge clutch in which the springs are formed with or connected to a common plate.

FIG. 6 illustrates another embodiment similar to that of FIG. 5, except the springs are connected together and formed as an extension of a single integral spring plate. In particular, rather than having a plurality of separate springs (such as springs 26), the switchable cylindrical wedge clutch is provided with a spring plate 60. The spring plate 60 can be assembled on the other axial side of the plate segments as the actuating ring 30.

FIGS. 7A-7B show the spring plate in isolation. The spring plate 60 has a plurality of springs 62 that fit between two adjacent plate segments 54 to press the plate segments 54 toward the valleys 48 of the hub, as explained below. Each spring 62 has a first leg 64 and a second leg 66 that come together at a joint 68. The legs 64, 66 extend from the face of the plate 60 and axially toward the actuating ring 30. The spring plate 60 also can have a circumferential inner surface 72 or of another shape to allow for full rotation of the inner shaft, and an outer surface 74 with flat regions 76 to provide room for the springs 62. The springs 62 may be radially board of the face 78 of the spring plate 60, as shown in FIG. 7B.

Utilization of a spring plate rather than individual and separate springs may improve manufacturing time and cost due to the ability to form the spring plate by stamping or piercing from a single plate. The spring plate can also be implemented into the previous embodiments described with reference to FIGS. 1-4.

In the embodiments described above, it can be said that the switchable cylindrical wedge clutch has an inner race, an outer race, and a plurality of wedge plate segments therebetween to wedge and lock the wedge clutch. In the embodiment of FIGS. 1-4, the inner shaft 12 acts as the inner race, and the carrier acts as the outer race. In the embodiment of FIGS. 5-6, the hub acts as the inner race, and the carrier or shaft acts as the outer race.

The switchable wedge clutch of this disclosure can be used in various applications to selectively couple one shaft to another. For example, the switchable wedge clutch can be used to selectively activate an all-wheel drive system, a four-wheel drive system, or the like in which torque is selectively transferred to another axle.

PARTS LIST 10 wedge clutch
12 input shaft
14 output shaft
16 first plate segment
16' first plate segment
18 second plate segment
20 carrier
22 grooves
24 grooves
26 spring
30 actuating ring
32 tapered finger
34 inner surface
36 valley
38 peak or apex
40 outer surface
42 pocket
44 hub
46 tapered outer surface
48 valley
50 peak or apex
54 plate segment
56 groove
60 spring plate
62 spring
64 first leg
66 second leg
68 joint
72 inner surface
74 outer surface
76 flat region
78 face While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A switchable wedge clutch, comprising:
an inner race extending about an axis and having an outer surface defining a plurality of grooves;
an outer race having an inner surface defining a plurality of tapered regions;
a plurality of wedge plate segments, each wedge plate segment having an inner surface moveable within the grooves and circumferentially about the inner race, and each wedge plate segment having a tapered outer surface configured to engage and slide relative to the tapered regions of the inner surface of the outer race;
a plurality of springs arranged about the axis, each spring coupled to a respective pair of the wedge plate segments and providing a biasing force to bias the pair of wedge plate segments away from each other; and
an actuating ring having a plurality of axially-extending tapered fingers configured to fit between two of the wedge plate segments, wherein axial movement of the actuating ring forces the wedge plate segments circumferentially against the biasing force of the springs, wherein the actuating ring extends about the inner race and can slide axially along the outer surface of the inner race.

2. The switchable wedge clutch of claim 1, wherein the actuating ring is moveable between
a first axial position in which the wedge plate segments are in a first circumferential position and wedged radially between the inner race and outer race to lock the clutch, and
a second axial position in which the tapered fingers force the wedge plate segments to a second circumferential position to unwedge the wedge plate segments from between the inner race and outer race to unlock the clutch.

3. The switchable wedge clutch of claim 1, wherein the inner surface of the outer race includes a plurality of apexes and a plurality of valleys located radially outward from the apexes.

4. The switchable wedge clutch of claim 3, wherein the wedge plate segments slide toward the apexes to lock the switchable wedge clutch, and slide toward the valleys to unlock the switchable cylindrical wedge clutch.

5. The switchable wedge clutch of claim 3, wherein each spring is located radially aligned with and inward of a respective one of the valleys.

6. A switchable wedge clutch, comprising:
an inner race and an outer race both rotatable about an axis, wherein one of the inner and outer races has first tapered surfaces;
a plurality of wedge plate segments arranged circumferentially about the axis, each wedge plate segment having a second tapered surface contacting the first tapered surface;
an actuating ring extending about the axis and having a plurality of fingers extending axially between the inner and outer races, wherein axial movement of the actuating ring moves the wedge plate segments circumferentially along the first tapered surfaces to lock or unlock the switchable wedge clutch; and
a plurality of springs arranged about the axis, each spring coupled to a respective pair of the wedge plate segments, wherein the springs extend from a common spring plate.

7. The switchable wedge clutch of claim 6, wherein the second tapered surfaces are tapered such that one region of each wedge plate segment is radially longer than another section of that wedge plate segment.

8. The switchable wedge clutch of claim 6, wherein the actuating ring is moveable between
a first axial position in which the wedge plate segments are in a first circumferential position and wedged radially between the inner race and outer race to lock the clutch, and
a second axial position in which the tapered fingers force the wedge plate segments to a second circumferential position to unwedge the wedge plate segments from between the inner race and outer race to unlock the clutch.

9. The switchable wedge clutch of claim 6, wherein each spring provides a biasing force to bias the pair of wedge plate segments away from each other.

10. The switchable wedge clutch of claim 6, wherein each spring provides a biasing force to bias the pair of wedge plate segments along the second tapered surface such that the pair of wedge plate segments are wedged between the inner and outer races.

11. The switchable wedge clutch of claim 6, wherein each spring includes a pair of legs coming together at a joint.

12. A system for selectively transferring torque between shafts, the system comprising:
an input shaft;
a hub connected about the input shaft, the hub having an outer surface with a plurality of tapered regions;
a plurality of wedge plate segments including a first wedge plate segment, a second wedge plate segment, and a third wedge plate segment, each wedge plate segment having a tapered inner surface contacting one of the tapered regions, and each wedge plate segment having an outer surface;
an outer race having an inner surface engaging the outer surfaces of the wedge plate segments, wherein the plurality of wedge plate segments are circumferentially slideable relative to the outer race;
a plurality of springs arranged about the hub and including a first spring between the first and second wedge plate segments and configured to provide a biasing force to bias the first and second wedge plate segments away from each other, wherein each spring includes a pair of legs extending axially and joining at a joint; and
an actuating ring having a plurality of fingers about the outer surface of the hub, the plurality of fingers including a first finger extending axially between the second and third wedge plate segments, wherein axial movement of the actuating ring forces the second wedge plate segment toward the first wedge plate segment.

13. The system of claim 12, wherein the actuating ring is moveable between
a first axial position in which the wedge plate segments are in a first circumferential position and wedged radially between the hub and the outer race to lock the input shaft to the outer race, and
a second axial position in which the tapered fingers force the wedge plate segments to a second circumferential position to unwedge the wedge plate segments from between the hub and the outer race to unlock the clutch.

14. The system of claim 12, wherein the springs are connected to one another via a spring plate.

15. The system of claim 14, wherein the spring plate is located axially opposite the actuating ring relative to the hub.

16. The system of claim 12, wherein the outer surface of each wedge plate segment includes a plurality of grooves to provide a meshing engagement between the wedge plate segments and the outer race.

* * * * *